United States Patent
Chen

(10) Patent No.: US 12,184,785 B2
(45) Date of Patent: Dec. 31, 2024

(54) STORAGE VIRTUALIZATION ARCHITECTURE WITH HYBRID BLOCKCHAIN AND THE METHOD THEREOF

(71) Applicant: The Flowchain Foundation Limited, Singapore (SG)

(72) Inventor: Jun-Hong Chen, Taipei (TW)

(73) Assignee: THE FLOWCHAIN FOUNDATION LIMITED, Singapore (SG)

( * ) Notice: Subject to any disclaimer, the term of this patent is extended or adjusted under 35 U.S.C. 154(b) by 288 days.

(21) Appl. No.: 17/793,591

(22) PCT Filed: Jan. 22, 2020

(86) PCT No.: PCT/SG2020/050031
§ 371 (c)(1),
(2) Date: Jul. 18, 2022

(87) PCT Pub. No.: WO2021/150163
PCT Pub. Date: Jul. 29, 2021

(65) Prior Publication Data
US 2023/0074590 A1   Mar. 9, 2023

(51) Int. Cl.
*H04L 9/32*   (2006.01)
*H04L 9/00*   (2022.01)
*H04L 9/08*   (2006.01)

(52) U.S. Cl.
CPC .......... *H04L 9/3239* (2013.01); *H04L 9/0825* (2013.01); *H04L 9/3297* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2018/0254841 A1 | 9/2018 | Nannra et al. | |
| 2018/0268401 A1* | 9/2018 | Ortiz | G06Q 20/326 |
| 2018/0373776 A1 | 12/2018 | Madisetti et al. | |
| 2019/0311148 A1 | 10/2019 | Andrade | |
| 2019/0349733 A1 | 11/2019 | Nolan et al. | |
| 2020/0167319 A1* | 5/2020 | Fritz | H04L 41/30 |
| 2021/0126769 A1* | 4/2021 | Soundararajan | H04L 9/3239 |

FOREIGN PATENT DOCUMENTS

| | | | | |
|---|---|---|---|---|
| CN | 108647523 B | * | 1/2020 | ........... G06F 21/602 |
| WO | WO-2018125989 A2 | * | 7/2018 | ......... G06F 16/1824 |
| WO | WO2019/010063 A1 | | 1/2019 | |

OTHER PUBLICATIONS

Zeng, "Pseudonymous PKI for Ubiquitous Computing", published 2006. (Year: 2006).*

* cited by examiner

*Primary Examiner* — Benjamin E Lanier
(74) *Attorney, Agent, or Firm* — MUNCY, GEISSLER, OLDS & LOWE, P.C.

(57) ABSTRACT

The present invention proposes a storage virtualization architecture, comprising a plurality of hybrid nodes to form a hybrid node network; a plurality of devices coupled to at least one hybrid node of the plurality of hybrid nodes, wherein each of the plurality of devices is installed with a file manager; and a public blockchain network coupled to the plurality of hybrid nodes.

13 Claims, 9 Drawing Sheets

STORAGE VIRTUALIZATION ARCHITECTURE WITH HYBRID BLOCKCHAIN AND THE METHOD THEREOF

TECHNICAL FIELD

The present invention relates to a storage virtualization technology, and more particularly, to a storage virtualization architecture with hybrid blockchain and the method for storage virtualization.

BACKGROUND

The Internet of Things (IoT) devices can generate and exchange security-critical data over the IoT network. Many IoT networks use the public-key infrastructure (PKI) to authenticate devices and ensure the data security as well as the data privacy. The IoT device has to sign the generated data by a digital public key, and deliver the data to the network for exchanging. However, such authentication method tends to be expensive for an IoT device regarding computing power and energy consumption.

Furthermore, the blockchain technology has the decentralized, secure, and private nature to become a promising idea that can be approaching the next-generation IoT architecture.

The blockchains could be either a public blockchain or a private blockchain. Anyone can join the public blockchain network, meaning that the blockchain network is entirely open to users for submitting transactions, accessing shared ledgers, and mining. More specifically, the public blockchain can enable a decentralized model that it can operate without any central authorizations; thus, the public blockchain has the natures of openness and trust. Unlike public blockchains, only authenticated users can join the private blockchain network. The user needs to request permissions from an authority in the private blockchain for joining the network. The authority validates the authenticity of a user, and grant permissions to authenticated users for submitting transactions and accessing shared ledgers. The conventional blockchain creates openness and trust of transactions in the public blockchain, and protect the privacy-sensitive data in the private blockchain.

In computer science, storage virtualization is the process of presenting a logical view of the physical storage resources to a host computer system, treating all storage media (hard disk, optical disk, tape, etc.) in the enterprise as a single pool of storage. In addition, storage virtualization can make limited storage devices play a more useful role by utilizing virtualization technology. The so-called storage virtualization is closely related to the distributed environment in the cloud system, which purpose is to effectively process the massive data distributed on different servers in a large distributed server cluster.

The present invention proposes a new blockchain technology to ensure the security of data accessing of enterprises and cloud-based by utilizing storage technology.

SUMMARY OF THE INVENTION

The present invention proposes a storage virtualization architecture, comprising a private blockchain network in at least one entity, wherein the private blockchain network has a plurality of hybrid nodes to form a hybrid node network; a plurality of devices coupled to at least one hybrid node of the plurality of hybrid nodes, wherein each of the plurality of devices has a file manager; and a public blockchain network coupled to the node network.

According to an aspect of the invention, the hybrid node network can self-organize as a peer-to-peer network. The public blockchain network are formed by multiple entities. Each of the multiple entities has a separate private blockchain network. The file manager slices a file into multiple data slices, and package the multiple data slices into a virtual blocks data structure. The multiple data slices are randomly distributed in the plurality of hybrid nodes. The file manager transmits virtual blocks to one hybrid node in the private blockchain network. The hybrid node verifies each block of the virtual blocks and packages the verified virtual blocks as a transaction, followed by submitting the transaction to the public blockchain network for storage.

According to one aspect of the invention, a method of storage virtualization, comprises the following steps: providing a private blockchain network having a plurality of hybrid nodes to form a hybrid node network; slicing a file into a plurality of data slices by a file manager of a device within the hybrid node network; transmitting each of the plurality of data slices by the device to a first hybrid node of the plurality of hybrid nodes; and transmitting serially and randomly each of the plurality of data slices by the first hybrid node to others hybrid nodes of the plurality of hybrid nodes.

The method further comprises verifying each of the plurality of data slices in the others hybrid nodes, and storing the verified data slices in the others hybrid nodes. The method further comprises packaging the verified data slices into transactions, and submitting the transactions to a public blockchain network for storage. The file manager is installed in the device. The plurality of hybrid nodes in the hybrid node network are distributed in multiple private blockchain networks. Each of the plurality of data slices and its timestamp are put into virtual blocks.

According to another aspect of the invention, a method of storage virtualization comprises the following steps: providing a private blockchain network having a plurality of hybrid nodes to form a hybrid node network; receiving serially a corresponding timestamp of each of a plurality of data slices from a public blockchain network by a corresponding hybrid node of the plurality of hybrid nodes; generating serially corresponding virtual blocks in all the corresponding hybrid node of the plurality of hybrid nodes; and putting all the corresponding timestamp and the plurality of data slices into the corresponding virtual block to form a virtual blocks data structure.

A Merkle root field is put into the corresponding virtual blocks. The plurality of hybrid nodes use the same Genesis block as a first block of whole blockchain of each of the plurality of hybrid nodes. An authenticity verification of the corresponding virtual blocks includes confirming whether the corresponding virtual blocks are fake and whether the corresponding timestamp of the corresponding virtual blocks is valid. Puzzle solutions are put into the corresponding virtual blocks.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention proposes a storage virtualization technology based on hybrid blockchain, which mainly address the issue of "resource security" of an internal file storage system of enterprise. The hybrid blockchain may refer to the pending patent application filed by the identical applicant, entitled by "Hybrid Blockchain Architecture with Computing Pool" . . . filed on 10 Oct. 2019. The pending patent is incorporated here for reference. In the present invention, the hybrid blockchain is comprised by multiple private blockchain networks and a public blockchain network. The hybrid blockchain is designed for the decentralized devices (IoT) application that can ensure a near real-time ability to read and submit transactions without full authentication.

The present invention also has high practicability, because "storage virtualization" technology of the invention is mainly provided to ensure the security of data accessing of enterprises and cloud-based by utilizing hybrid blockchain storage technology. According to the present invention, the storage virtualization technology will protect the enterprise's security. The proposed hybrid blockchain storage technology can provide a more secure solution than traditional technology, such as traditional disc mapping or virtualized storage disc mapping.

Storage virtualization is a storage technology which is more secure and more able to protect the internal and privacy data of enterprises. The proposed technology introduces the "hybrid blockchain" technology, and further uses the blockchain technology to strengthen the traditional virtual storage technology to ensure the security of data access. Based on the application design, the hybrid blockchain architecture of the present invention involves a hybrid model by leveraging the benefits of both public and private blockchains.

I. Storage Virtualization Architecture

Figure 1:
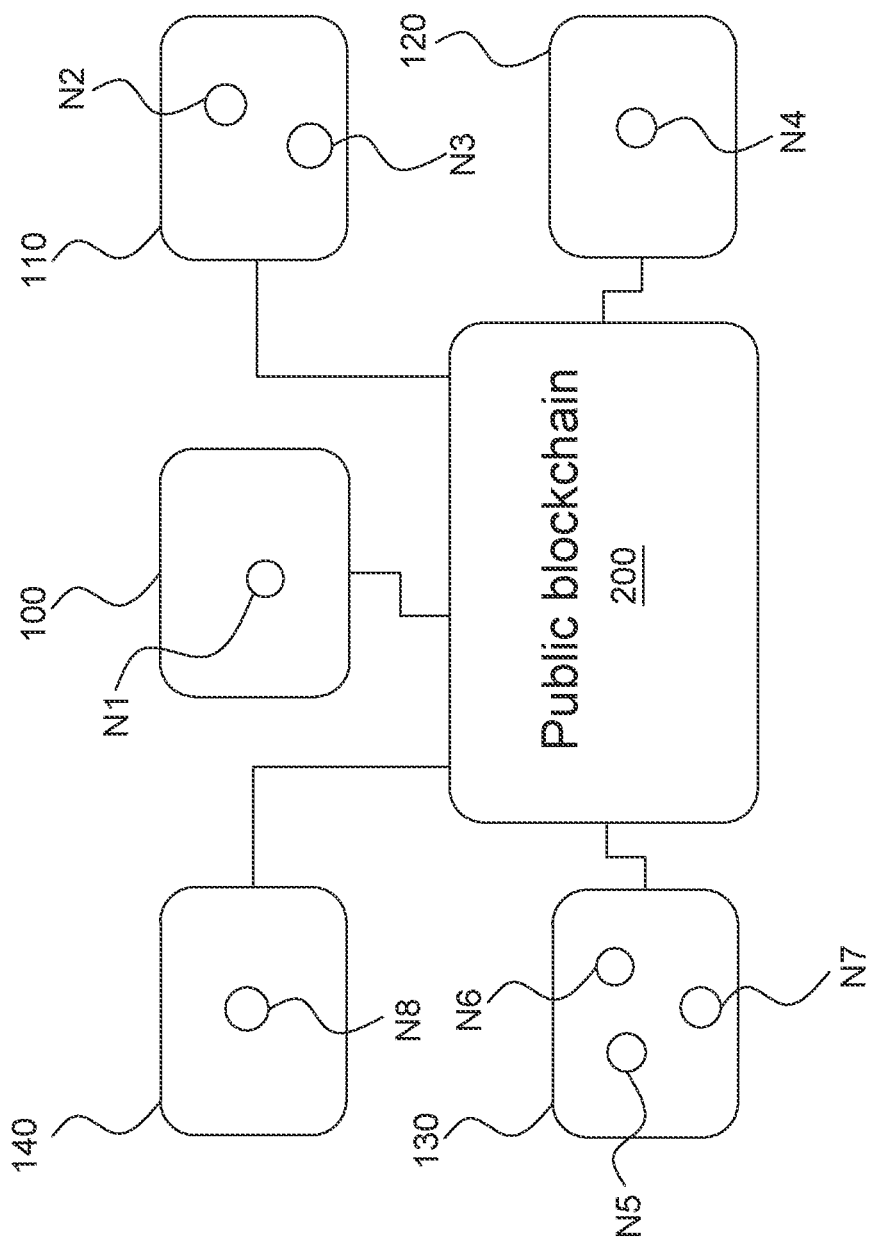
FIG. 1 illustrates a storage virtualization architecture using hybrid blockchain of the present invention.

As shown in FIG. 1, it describes a storage virtualization architecture using hybrid blockchain (based on hybrid blockchain) of the present invention. The storage virtualization architecture comprises a plurality of entities and a public blockchain network 200. In this embodiment, the storage virtualization architecture have five entities including entity 100, entity 110, entity 120, entity 130 and entity 140, and eight hybrid nodes including hybrid nodes N1, N2, N3, N4, N5, N6, N7 and N8. Each entity (entity 100, entity 110, entity 120, entity 130 or entity 140) is equipped with one or more hybrid nodes; accordingly, each entity has personal computer, mobile phone, smart phone, intelligent family device, etc (hereinafter referred to as "devices"). The hybrid node acts as a hybrid blockchain node in the storage virtualization architecture. Number of the hybrid nodes and the IoT devices in each entity are not limited. The entity 100 has a hybrid node N1, the entity 110 has a hybrid node N2 and N3, the entity 120 has a hybrid node N4, the entity 130 has a hybrid node N5, N6 and N7, and the entity 140 has a hybrid node N8. Each entity forms a private blockchain network, wherein each hybrid node can provide the function of file storage. The first entity 100 forms a first private blockchain network; the second entity 110 forms a second private blockchain network, and so on. That is, multiple entities forms multiple private blockchain networks. All private blockchain networks connect and exchange information with each others through a public blockchain network.

Each private blockchain network is an IoT blockchain network and the public blockchain network 200 is a communication blockchain network. The communication blockchain network is selected from an internet network, wifi network, Bluetooth network and telecommunication network. Take company as an example, the entity 100, 110, 120, 130 and 140 are five different companies, so there are five private blockchain networks, wherein the entity 100 has a hybrid node, for example, the entity 110 has two hybrid nodes, the entity 120 has two hybrid nodes, the entity 130 has three hybrid nodes, and the entity 140 has a hybrid node. The private blockchain network is where devices can store their private data and ensure their data privacy. Each of the devices in the private blockchain network 100 can decide which data can be public by submitting the transactions of the data to the public blockchain network 200. In this embodiment, the storage virtualization architecture have five entities and eight hybrid nodes. The hybrid nodes can be self-organized as a peer-to-peer (p2p) hybrid node network by using the Chord algorithm or other p2p algorithms, and a specified protocol. The public blockchain network 200 can verify transactions and record the verified transactions. The transactions in the public blockchain network 200 are public and opened to anyone (user of the IoT devices), meaning that anyone can access the transactions in the public blockchain network 200. Hybrid node is a device that receives data (puzzles) from the public blockchain network 200 and delivers data (puzzles) over the p2p network of the private blockchain network. Each of the hybrid node includes a transceiver.

Each entity has one or more hybrid node and devices, such as personal computer, mobile phone, smart phone, intelligent family device, etc. that executing the application by this present invention. There are multiple mobile phones, computers and IoT devices (hereinafter referred to as devices) in each entity. Each device is installed with a file manager, which can store and read a file through the hybrid node. The file manager is a file manager application that integrates with virtualization substantially enables each device control and store the file.

When the file manager stores the file, it will slice the file into multiple data slices, and package all data slices into a virtual blocks data structure. The file manager transmits the virtual blocks and all data slices to any one hybrid node in the private blockchain network in batch or real-time mode.

Subsequently, after the hybrid node receives the the virtual blocks, it takes out each block of the virtual blocks and verifies each block. After the verification, the verified block is packaged as transactions, followed by submitting the transactions to the public blockchain network for permanent storage.

Then, after the hybrid node receives the data slices, the hybrid node selects a node (hereinafter referred to as "producer node") from the P2P network of the hybrid nodes by random or P2P algorithm for each data slice, and then transmits each data slice to the producer node. After the producer node receives the data slice from the P2P network, it stores the data slice in the local storage device. The different data slices are stored in different hybrid nodes in a random way. That is, all data slices are randomly distributed in different hybrid nodes. The hybrid node selected by other hybrid node is called producer node.

The present invention takes advantage of the decentralized and distributed characteristics of hybrid blockchain and P2P networks to reduce the management risk of typical virtualized storage disc mapping.

II. Data Slicing

Figure 2:
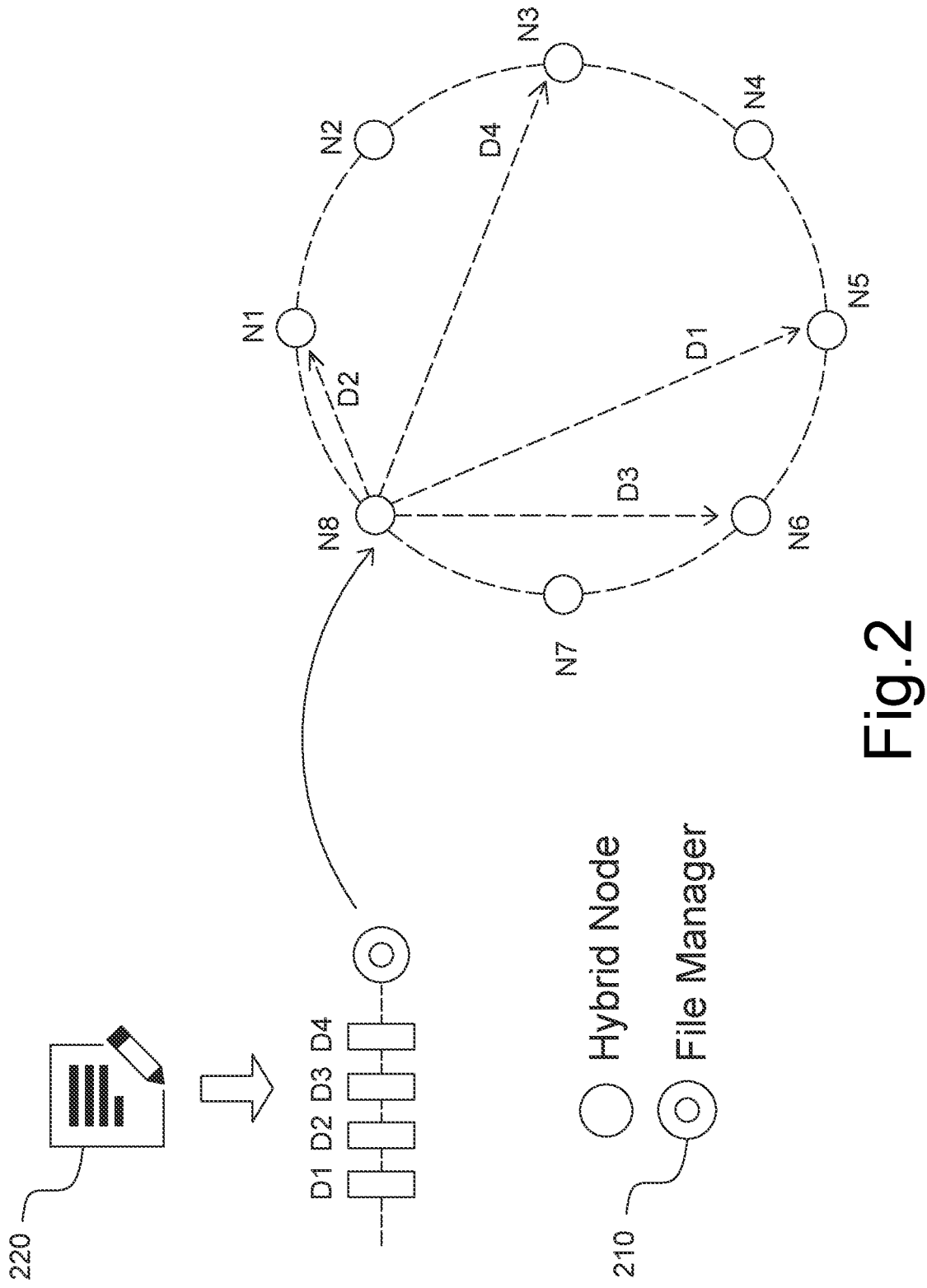
FIG. 2 illustrates a diagram of a data slicing of the invention.

The virtualization storage of the invention adopts a data slicing technology. Take FIG. 2 as an example, it shows a diagram of a data slicing. The process flow of the data slicing describes as follows:

1. The total of hybrid nodes is eight, marked as N1, N2, N3, N4, N5, N6, N7, N8.
2. In the private blockchain to which the hybrid node N8 belongs, there is a file manager 210 to store a file 220.
3. The file manager 210 is slicing the file 220 into multiple data slices, for example four data slices, marked as D1, D2, D3, D4.
4. The file manager 210 transfers the four data slices D1, D2, D3 and D4 to the hybrid node N8, through wireless communication module.
5. As the hybrid node N8 receives the data slice D1, it randomly selects a producer node of the the data slice D1. Take FIG. 2 as an example, the producer node of the data slice D1 is the hybrid node N5, and the hybrid node N8 transmits the data slice D1 to the hybrid node N5.
6. The authenticity verification of the data slice D1 is performed in the hybrid node N5, and then the verified data slice D1 is stored in the local storage device (the hybrid node N5).
7. The hybrid node N5 packages the verified data slice information into transactions (transaction records) after the data slice D1 is stored, and submits the transaction records to the public blockchain network for permanent storage.
8. By analogy with storage of the data slice D1, the following processes are storing the data slice D2, D3 and D4. Take FIG. 2 as an example, the producer node of the data slice D2 is the hybrid node N1, the producer node of the data slice D3 is the hybrid node N6, and the producer node of the data slice D4 is the hybrid node N3, so that the authenticity of the data slice D2 is verified and stored by the hybrid node N1, the authenticity of the data slice D3 is verified and stored by the hybrid node N6, and the authenticity of the data slice D4 is verified and stored by the hybrid node N3; finally, the verification information of the data slice D2 and D4 are submitted to the public blockchain.

Data slice is a time series of data. Take FIG. 3 as an example, it shows a time series data. When the hybrid node N8 receives different data slices at different times, the time is recorded by using a value representing the current time broadcasted by the public blockchain network, which is marked as $\lambda$. The hybrid node can treat $\lambda$ value as a timestamp of the data slice. A timestamp is a sequence of characters, data or encoded information identifying when a certain event occurred.

Figure 3:
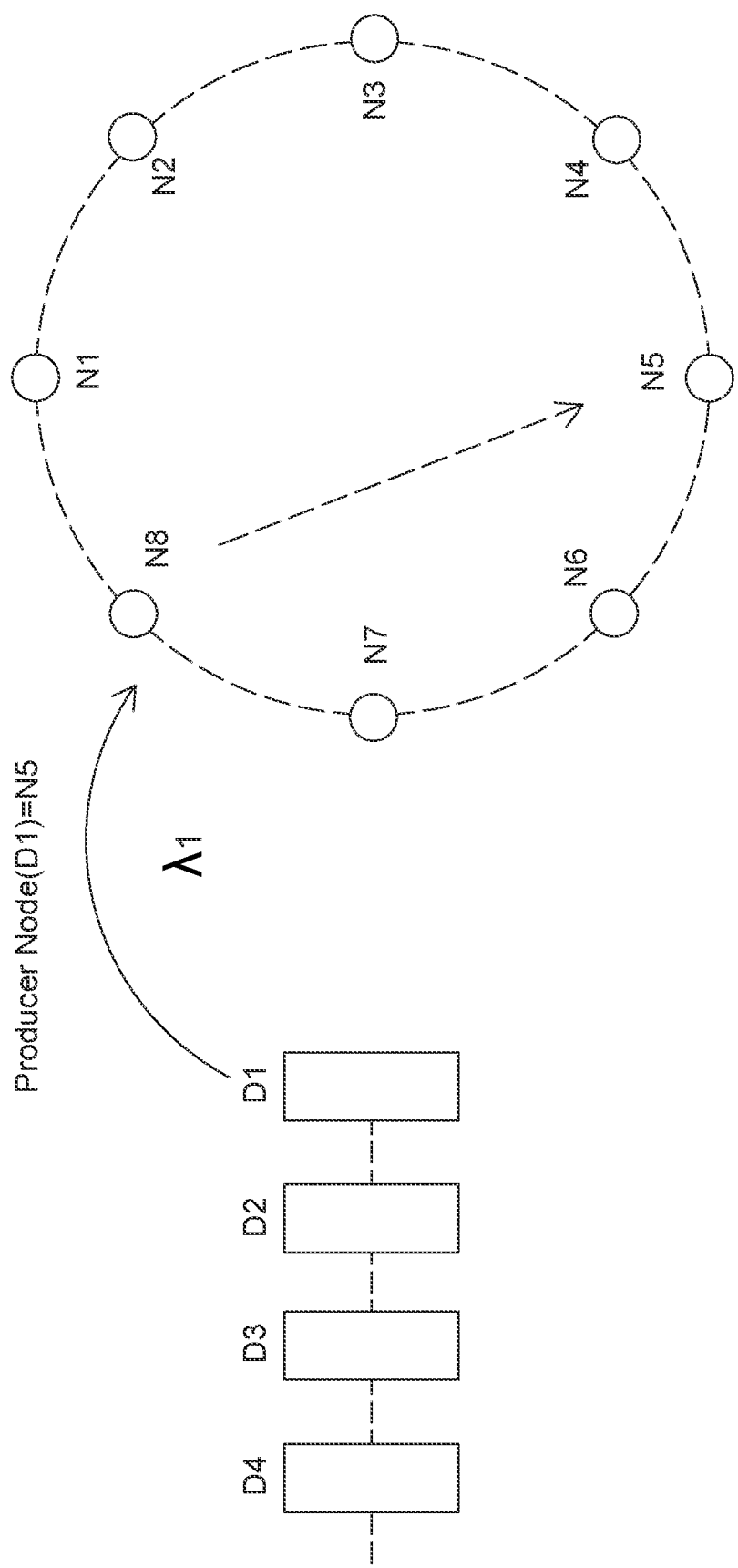
FIG. 3 illustrates a hybrid node N8 processing the data slice D1 of the invention.

As shown in FIG. 3, when the hybrid node N8 processes the data slice D1, the time received by the public blockchain is marked as $\lambda 1$. This $\lambda 1$ value together with the data slice D1 will be put into the virtual blocks. The data slice D1 is stored on the hybrid node N5 node at $\lambda 1$.

Figure 4:
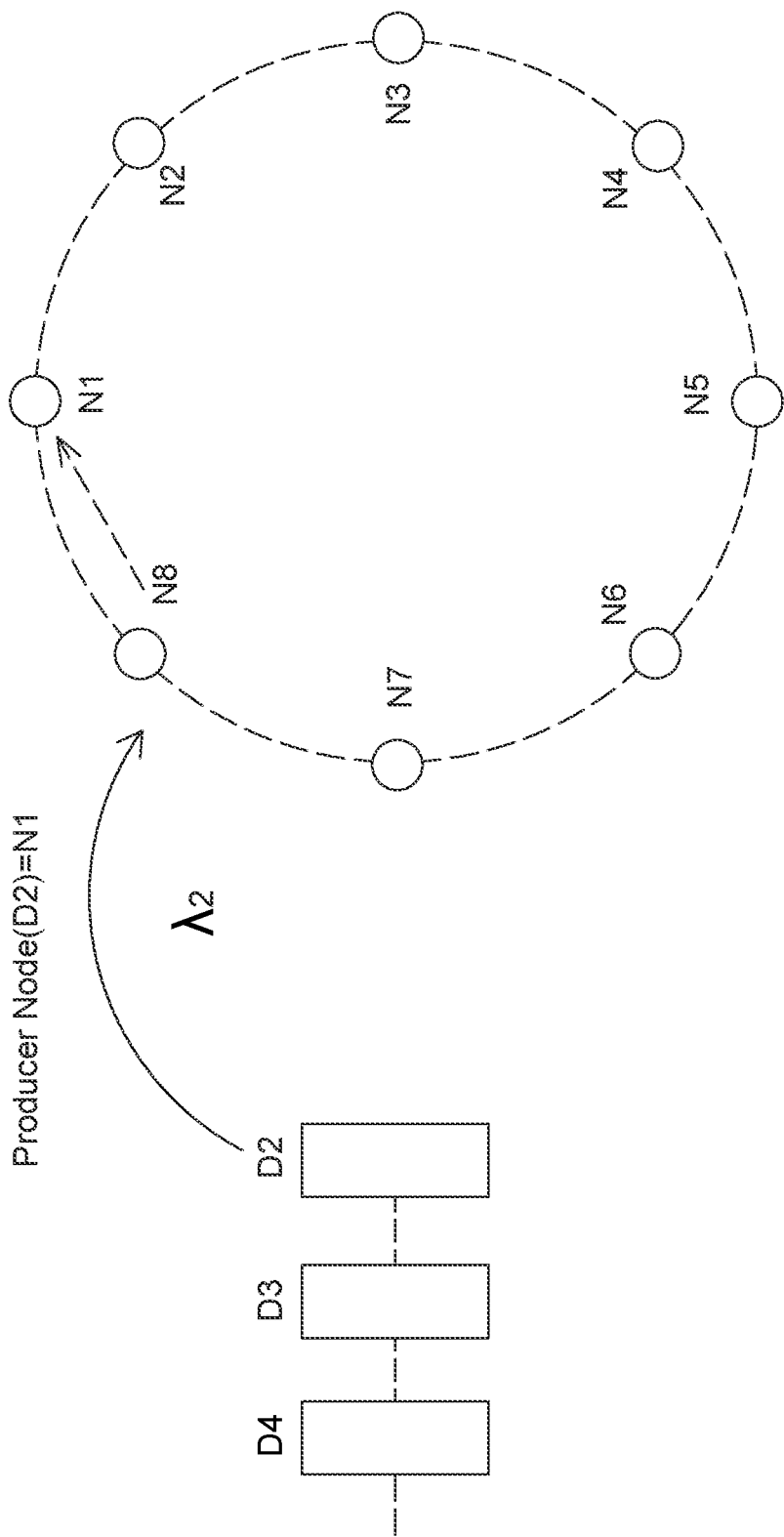
FIG. 4 illustrates a hybrid node N8 processing the data slice D2 of the invention.

As shown in FIG. 4, when the hybrid node N8 processes the data slice D2, the time received by the public blockchain is marked as $\lambda 2$. This $\lambda 2$ value together with the data slice D2 will be put into the virtual blocks. The data slice D2 is stored on the hybrid node N1 node at $\lambda 2$.

Figure 5:
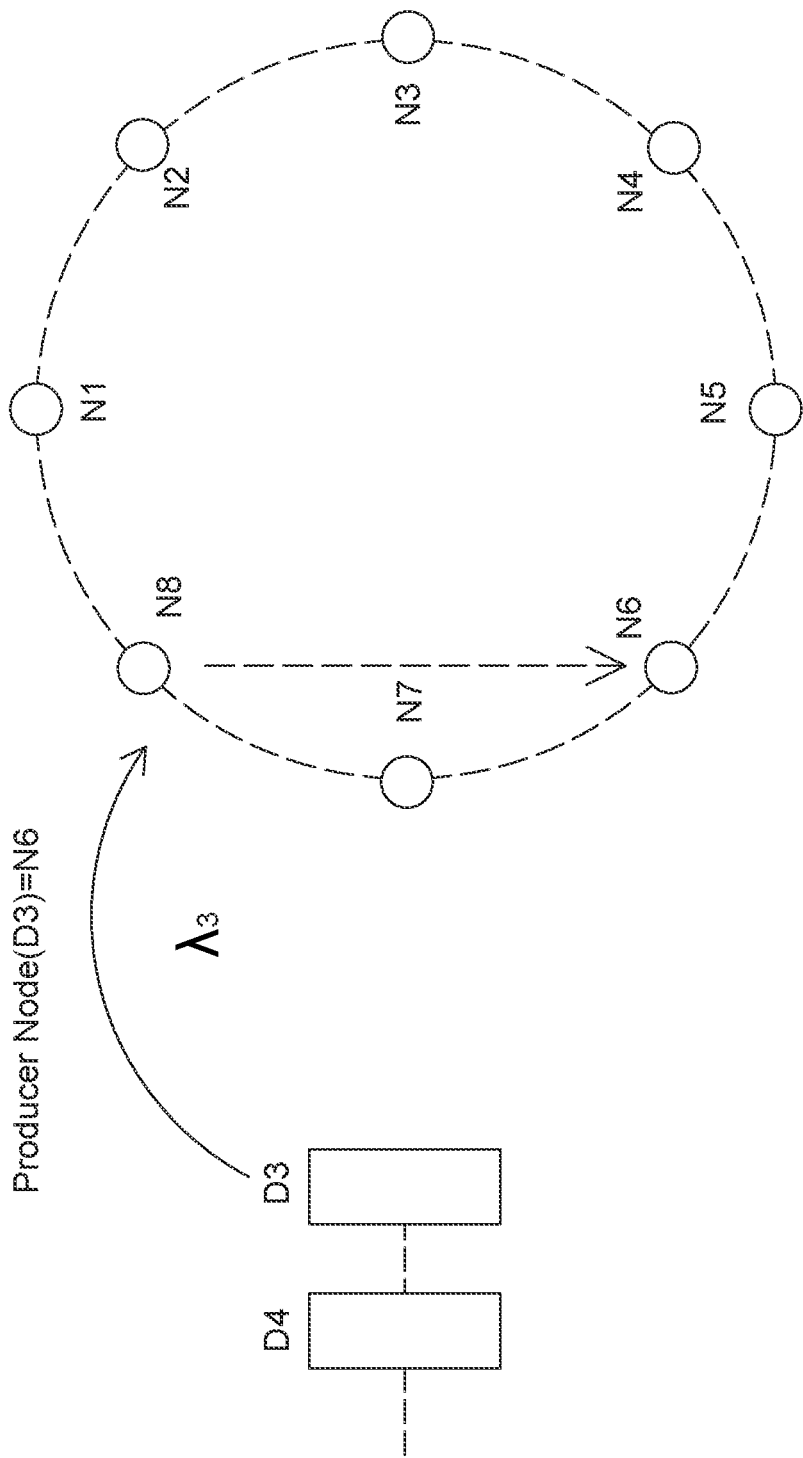
FIG. 5 illustrates a hybrid node N8 processing the data slice D3 of the invention.

As shown in FIG. 5, when the hybrid node N8 processes the data slice D3, the time received by the public blockchain is marked as $\lambda 3$. This $\lambda 3$ value together with the data slice D3 will be put into the virtual blocks. The data slice D3 is stored on the hybrid node N6 node at $\lambda 3$.

Figure 6:
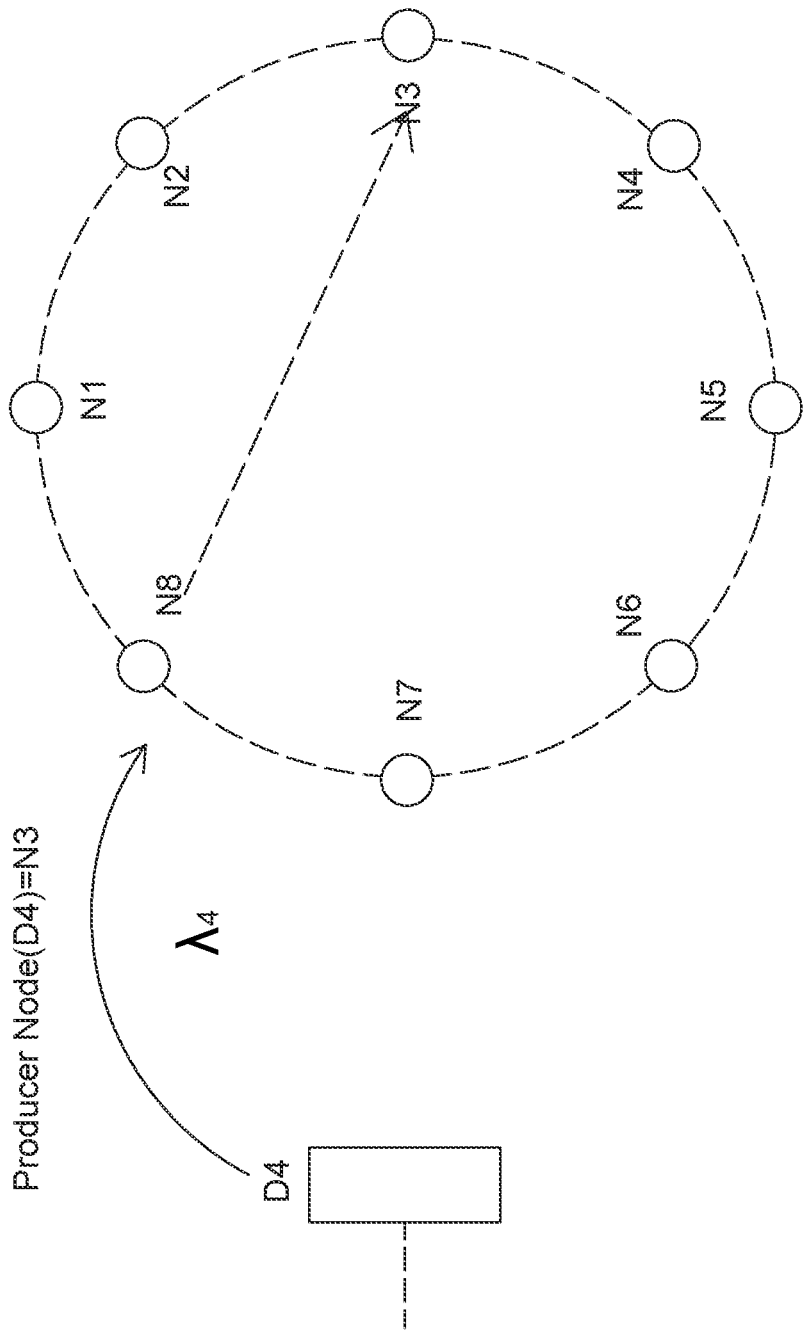
FIG. 6 illustrates a hybrid node N8 processing the data slice D4 of the invention.

As shown in FIG. 6, when the hybrid node N8 processes the data slice D4, the time received by the public blockchain is marked as $\lambda 4$. This $\lambda 4$ value together with the data slice D4 will be put into the virtual blocks. The data slice D4 is stored on the hybrid node N3 node at $\lambda 4$.

III. Virtual Blocks

Figure 7:
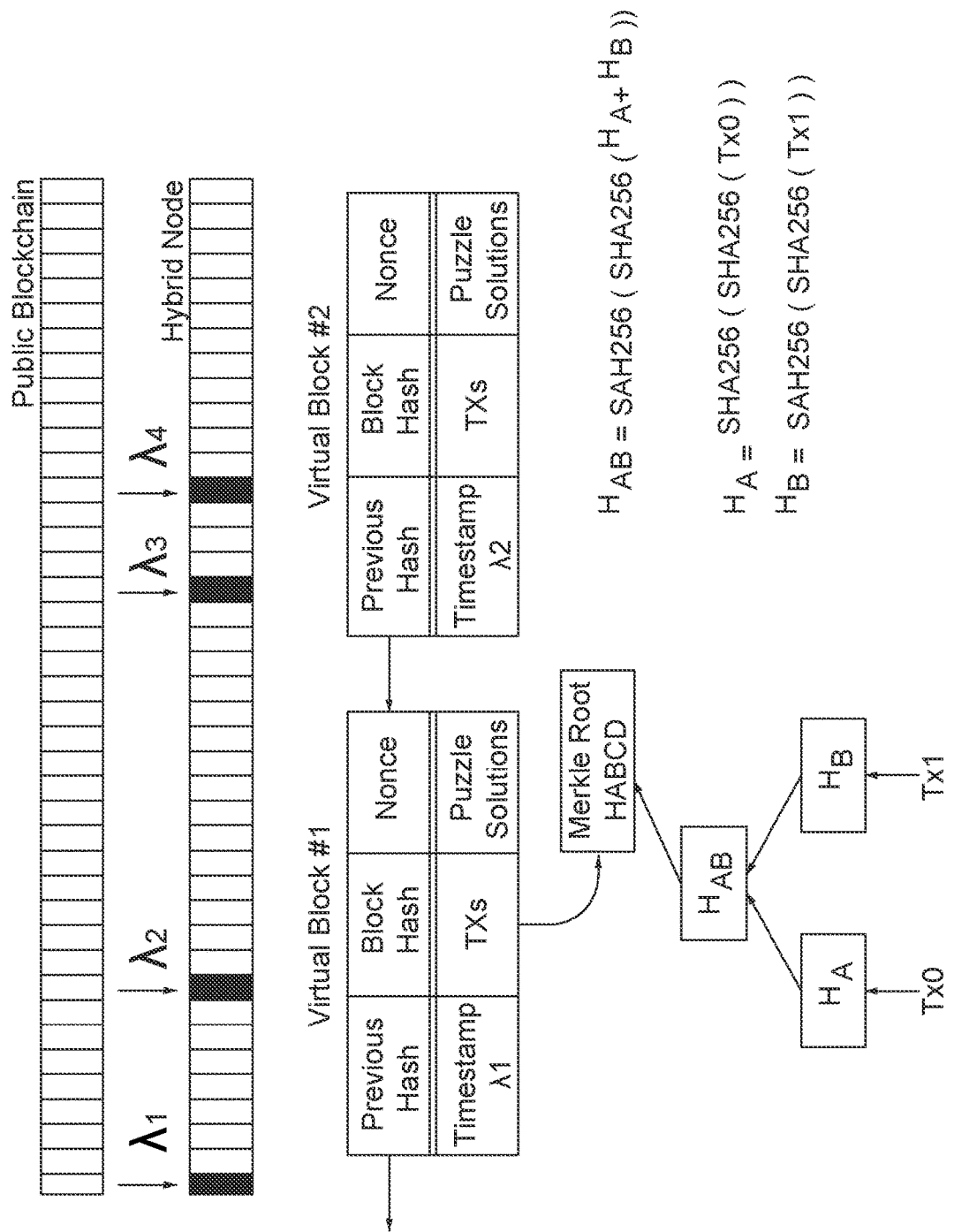
FIG. 7 illustrates a virtual blocks data structure in accordance with the invention.

According to the above-mentioned, when the hybrid node receives the k value from the public blockchain, it will maintain a local blockchain called virtual blocks, which data structure is shown in FIG. 7. In each virtual block, previous hash, block hash, nonce, timestamp ($\lambda$), Merkle root (TXs) and puzzle solutions are put into therein. After the file manager of the private blockchain transfers the data slice to the hybrid node, the hybrid node will package the data slice as transactions (transaction data/information), and then put the transaction data into the latest virtual block.

The present invention uses the public blockchain and virtual blocks technology to verify each data slice from the private blockchains and confirm the timestamp. The hybrid node first records the data slice in the private blockchain in the virtual blocks, and then transfers the virtual blocks to the public blockchain in real time or in batches for final verification. Technically, the virtual blocks can submit the data slice in batches to the public blockchain for verifying. This mechanism can also provide real-time transactions. Therefore, this technology can make the virtual storage of the present invention more efficient. The forming process of the data structure of the virtual blocks in FIG. 7 are detailed description as follows:

1. The hybrid node receives $\lambda$ value representing the current time from the public blockchain network, which is marked as $\lambda_1$.
2. The hybrid node continuously receives different k values. As shown in FIG. 7, four $\lambda$ values are arbitrarily taken, representing four different time points, which are labeled as $\lambda_1$, $\lambda_2$, $\lambda_3$ and $\lambda_4$ respectively.
3. When $\lambda_1$ is received, the hybrid node will generate the first block, marked as virtual block #1. Therefore, the hybrid node also plays the role of virtual block producer.
4. The data slice received from the file manager in the private blockchain network within $\lambda_1$ time is put into the virtual block #1 by a cryptography algorithm, as shown in FIG. 7. Cryptographic algorithm is applied in an increasing number of devices to satisfy their high security requirements. Cryptographic algorithm is used for important tasks such as data encryption, authentication, and digital signatures. For example, the used cryptography algorithm is SHA256 (SHA: Secure Hash Algorithm). SHA256 algorithm generates an almost-unique, fixed size 256-bit (32-byte) hash. The hybrid node can use any cryptography algorithm according to different applications.

5. When $\lambda_2$ is received, the hybrid node will generate the second block, marked as virtual block #2, and the received data slice is put into the virtual block #2 at this time.

6. By analogy with putting process of the received others data slices, the following processes are putting the remaining data slices into corresponding virtual blocks. Then, a virtual blocks data structure is produced.

Different hybrid nodes will generate different virtual blocks. The method of block generation can be designed by the system developer of blockchain. In general, the generation process of the virtual blocks is called "mining". A block in the blockchain called Genesis block is the first block of the whole blockchain. Genesis block is produced by a direct definition, and the Genesis block will have its own hash value, which is generated by the hash algorithm, so it is also called hash ID (block hash) as shown in FIG. 7. Block #1 is generated by using an algorithm operation. Block #1 also has its own hash ID, and the block #1 uses the previous hash field to connect to the previous block (Genesis block: block #0). In the same way, block #2 and more blocks are generated. These blocks distributed on the global area will have a number, which is the "order" of block generation. These blocks are connected with previous hash fields in series. This chain in series is called the blockchain. Each block has a Merkle root field, which indicates a Merkle tree. Each block can be used for "accounting". The whole blockchain in series is a complete account book, so the blockchain is also called distributed ledger. In technical, the Merkle tree in the block is the field responsible for accounting.

Merkle tree is a kind of hash tree, which is used to represent the data structure of hash value. The basic structure of Merkle tree is binary tree. Each node of non-leaf is marked with a hash value, and the top hash is Merkle root ($H_{ABCD}$), as shown in FIG. 7.

Although all hybrid nodes have their independent virtual blocks, all hybrid nodes use the same Genesis block as the first block of the whole blockchain of each hybrid node, which solves the trust problem between the hybrid nodes.

Figure 8:
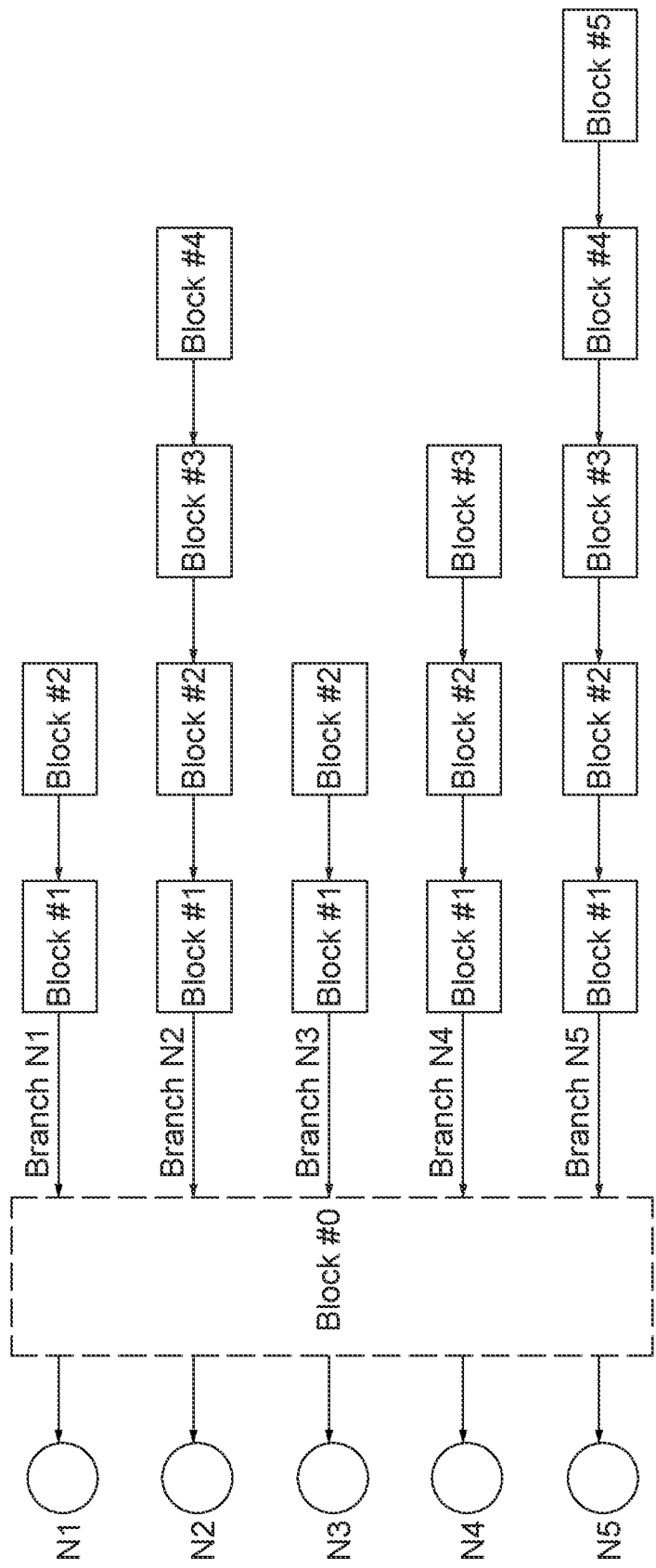
FIG. 8 illustrates trust and consensus mechanism between the hybrid nodes in accordance with the invention.

As shown in FIG. 8, although the hybrid node N1 and the hybrid node N2 are different hybrid nodes generating independent virtual blocks, the same Genesis block is used to generate virtual blocks. Therefore, virtual blocks of the hybrid node N1 and virtual blocks of the hybrid node N2 can be regarded as the same blockchain. Similarly, the hybrid node N1 and the hybrid node N2 can trust with each other because they use the same Genesis block. The invention's virtual blocks technology provides the trust and consensus mechanism between the hybrid nodes, as shown in FIG. 8.

IV. Verification of Public Blockchain

Based on the above-mentioned, after the public blockchain receives the virtual blocks sent by the hybrid node, the authenticity of the virtual blocks is verified. The authenticity verification method is described as follows.

1. Confirm whether the virtual blocks are fake;
2. Confirm whether the timestamp of the virtual blocks is valid (i.e. correct).

Each virtual block will store $\lambda$ and puzzle solutions, as shown in FIG. 7. Puzzle solutions are calculation problem (puzzle) provided by the public blockchain when it transmits $\lambda$ to the hybrid node. Therefore, the public blockchain is actually transmitting a set of data ($\lambda$, puzzle) to the hybrid node.

As described as the below function, it shows using a pseudonymous public-key infrastructure (PPKI) technology to conduct block digital signature and verification. $\lambda$ can be used as the public key provided by the public blockchain. Each virtual block generated by the hybrid node is stored with $\lambda$ value. Therefore, $\lambda$ can not only be regarded as a timestamp, but also a technology to replace the traditional public key.

$$\text{trust} = f(\text{transaction, signature, } publicKey)$$
$$\uparrow \qquad \uparrow$$
$$PPKI = \text{puzzle} + \lambda$$

Puzzle is a calculation problem, and its calculation result is called puzzle solutions. Puzzle is generated based on $\lambda$ value. Each hybrid node receives different puzzle, so its solutions are different. The hybrid node puts the puzzle solutions into the virtual block. Since the puzzle solutions of each hybrid node are different, puzzle can be regarded as a technology to replace the traditional private key. $\lambda$ can be regarded as a technology to replace the traditional public key.

In the hybrid blockchain network, a pseudonymous public-key infrastructure (PPKI) is used to authenticate devices and ensure the data security as well as the data privacy. The above-mentioned technology to replace the traditional public key and private key with ($\lambda$, puzzle) is called PPKI. PPKI technology can be used to verify the authenticity of virtual blocks.

V. Practical Application

The hybrid blockchain is formed by multiple private blockchains and one public blockchain. The private blockchain can choose Ethereum, which is recognized as having good security, to form a special technology scheme of hybrid blockchain for enterprises. The hybrid blockchain can bring many advantages to enterprises, such as information exchange between branches of multinational. Different branches have their own private blockchain environment. Among the branches, the information can be exchanged in combination with the public blockchain, while the transaction is permanently stored in the public blockchain to permanently record and track the process of accessing and exchanging information by employees.

According to the above description, each file is represented by several data slices, and stored in different hybrid nodes (storage nodes). Different hybrid nodes can trust with each other through consensus algorithm of the virtual blocks. That is, data slices stored in the private blockchain nodes can have an authenticity record in the public blockchain.

Figure 9:
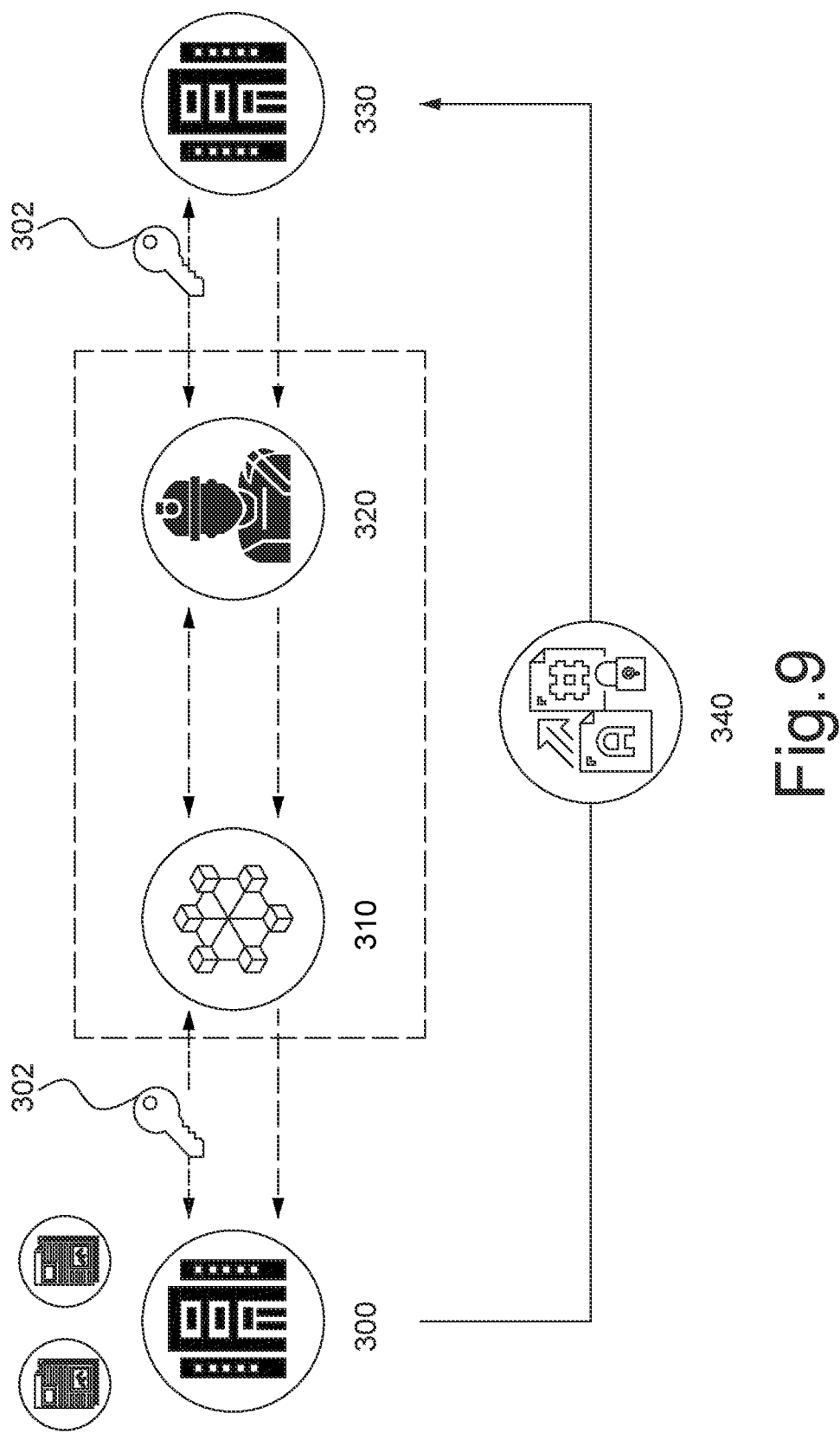
FIG. 9 illustrates a process of digital identity signature in accordance with the invention.

As shown in FIG. 9, it illustrates a process of digital identity signature, which is an application for storage virtualization of the present invention. First, a first entity (first subsidiary company) 300 transfers a key (hash value) 302 of an encoded file 340 to a public blockchain 310. The first entity 300 can examine and check the key 302 in the public blockchain 310 in real time. Then, the key 302 is verified by a miner 320 and stored in the public blockchain 310, followed by transmitting to a second entity (second subsidiary company) 330. The miner 320 and the second entity 330 can examine and check the key 302 in the public blockchain 310 in real time. Subsequently, after the second entity 330 receives the verified key, it sends a result of identity verification to the first entity 300. As the first entity 300 confirms that the identity is correct, the encoded file 340 is transmitting to the second entity 330. Finally, the second entity 330 decodes the received encoded file 340.

The file manager only needs to save the first data slice (referred to as key) of each file, and then it can find all remaining data slices in different storage (hybrid) nodes through the verification process on the public blockchain, and reorganize (recover) the original file. Different branches (subsidiary companies) only need to exchange the key to realize the function of safe storage and file exchange.

Public blockchains, such as Nakamoto blockchain, use the permissionless blockchain to build a trusted machine to read and submit transactions. Furthermore, private blockchains use the permissioned blockchain to build such trusted machine by granting access permissions only to authenticated participants. In the private blockchain network, users need to be pre-authenticated before reading and submit transactions. However, the pre-authenticated is time-consuming to achieve near real-time transactions for today's IoT applications.

In the private blockchain network, the users can submit sensory data, issue such data as digital assets, and submit to the hybrid consensus system. The consensus system can determine which transactions are opened to public blockchains for public access. The consensus system can subsequently record such transactions in the public blockchains with openness, trust, provenance, and immutability. More importantly, the decentralized model has been proposed to ensure an openness and trust network by verifying transactions without any central authorizations. Therefore, this present invention introduces the hybrid blockchain model by using the public blockchains to provide such decentralized model.

The public blockchain network can record transactions in the distributed ledgers, the blockchains across all miners after some miners successfully agree on the transactions; the process is called proof-of-work consensus. The transactions recorded in the public blockchain are trusted transactions and immutable. Moreover, the miners should ensure that the transactions are submitted from the authenticated nodes. As such, the hybrid blockchain has a hybrid consensus that can achieve such multi-party trust. The hybrid blockchain provides these settings to support the consensus system for multi-party trust: (1) in the public blockchain, the miners can verify transactions from a pseudonymously authenticated node; (2) the public blockchain network can agree on the transactions by proof-of-work consensus.

The present invention proposes that the hybrid nodes can use the virtual blocks concept to store a file, local transactions. Hybrid nodes can temporarily store the file or their transactions in the virtual blocks and submit the stored file or transactions to the public blockchain network for replicating. The hybrid nodes can submit real-time sensitive transactions immediately to the public blockchain and save the transactions in the virtual blocks.

It will be understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A storage virtualization architecture, comprising:
   a private blockchain network in at least one entity, wherein said private blockchain network has a plurality of hybrid nodes to form a hybrid node network;
   a plurality of devices coupled to at least one hybrid node of said plurality of hybrid nodes, wherein each of said plurality of devices has a file manager; and a public blockchain network coupled to said hybrid node network; wherein corresponding virtual blocks are generated in said hybrid node of said plurality of hybrid nodes, wherein a Merkle root field and puzzle solutions are put into said corresponding virtual blocks, wherein corresponding timestamps and a plurality of data slices from the public blockchain network are put into said corresponding virtual blocks to form a virtual block data structure.

2. The architecture as set forth in claim 1, wherein said hybrid node network can self-organize as a peer-to-peer network.

3. The architecture as set forth in claim 1, wherein said public blockchain network are formed by multiple entities.

4. The architecture as set forth in claim 3, wherein each of said multiple entities has a separate private blockchain network.

5. The architecture as set forth in claim 1, wherein said file manager slices a file into multiple data slices, and package said multiple data slices into a virtual blocks data structure.

6. The architecture as set forth in claim 5, wherein said multiple data slices are randomly distributed in said plurality of hybrid nodes.

7. The architecture as set forth in claim 5, wherein said file manager transmits virtual blocks to one hybrid node in said private blockchain network.

8. The architecture as set forth in claim 5, wherein said hybrid node verifies each block of said virtual blocks and packages said verified virtual blocks as a transaction, followed by submitting said transaction to said public blockchain network for storage.

9. A method of storage virtualization, comprising:
   providing a private blockchain network having a plurality of hybrid nodes to form a hybrid node network;
   receiving serially a corresponding timestamp of each of a plurality of data slices from a public blockchain network by a corresponding hybrid node of said plurality of hybrid nodes;
   generating serially corresponding virtual blocks in all said corresponding hybrid node of said plurality of hybrid nodes; and
   putting all said corresponding timestamp and said plurality of data slices into said corresponding virtual blocks to form a virtual blocks data structure; wherein a Merkle root field and puzzle solutions are put into said corresponding virtual blocks.

10. The method as set forth in claim 9, wherein said plurality of hybrid nodes use the same Genesis block as a first block of whole blockchain of each of said plurality of hybrid nodes.

11. The method as set forth in claim 9, wherein a pseudonymous public-key infrastructure (PPKI) technology is used to conduct digital signature and verification of an authenticity of said corresponding virtual blocks.

12. The method as set forth in claim 11, wherein said corresponding timestamp of said corresponding virtual blocks is used as a public key provided by said public blockchain.

13. The method as set forth in claim 9, wherein an authenticity verification of said corresponding virtual blocks includes confirming whether said corresponding virtual blocks are fake and whether said corresponding timestamp of said corresponding virtual blocks is valid.

* * * * *